UNITED STATES PATENT OFFICE 2,688,560

EYE-PROTECTIVE OPHTHALMIC GLASS

William H. Armistead, Corning, N. Y., assignor to Corning Glass Works, Corning, N. Y., a corporation of New York No Drawing. Application April 27, 1953,
Serial No. 351,492

14 Claims. (Cl. 106—52)

This invention relates to neutral or gray-colored ophthalmic glasses having substantial absorption for infrared and ultraviolet as well as visible radiations.

Infrared and ultraviolet radiations are effectively absorbed by glasses containing FeO and $Fe_2O_3$ respectively, and these oxides are commonly utilized in glasses for these purposes. A glass containing both FeO and $Fe_2O_3$, melted under reducing conditions, has a greenish color which can be neutralized to gray by combination with the complementary purple color produced by NiO in glasses of the type $K_2O.RO.SiO_2$ where R is a bivalent metal of the second periodic group. The color of such a neutral glass is difficult to control, however, because the greenish complement tends to vary objectionably in hue depending upon the extent of the reduction.

I have now discovered that the inclusion of $TiO_2$ in such a glass provides control of the hue of its greenish complement and thereby of the desired neutral color, as a result of which minor variations in the reducing conditions can be readily tolerated without the production of any deleterious effects.

The new neutral-colored glasses are reduced glasses which comprise essentially 50 to 75% $SiO_2$, 14 to 23% $K_2O$, and up to 25% ZnO, and contain glass-coloring components consisting of FeO and $Fe_2O_3$ totalling 0.3% to 4.5% computed as $Fe_2O_3$, 0.1% to 2% $TiO_2$, and 0.02% to 0.50% NiO, the ratio of the computed $Fe_2O_3$/NiO being 5/1 to 15/1, the essential constituents totalling at least 75. Preferably, the amount of $K_2O$ does not exceed 20%.

$B_2O_3$ is also a glass-stabilizing oxide; and I find that it can be alternatively included as an essential ingredient in the present compositions, provided that it does not exceed 20% and provided that the total of ZnO and $B_2O_3$, if both are present, does not exceed 30%.

If desired, auxiliary glass-stabilizing oxides, namely, up to 12% BeO, up to 15% MgO, up to 20% CaO but not over 20% of MgO+CaO, up to 25% SrO, up to 25% CdO, up to 25% BaO, up to 15% $Al_2O_3$ and up to 10% $ZrO_2$ can optionally be included, singly or in combination, within the indicated amounts in the present glass compositions provided that their total does not exceed 25%.

As is well known, the other alkali metal oxides commonly used in glass-making, namely, $Na_2O$ and $Li_2O$ possess a greater fluxing power than $K_2O$ and, when substituted for $K_2O$, serve to improve the meltability of the glass and to lower its softening point. (By softening point is meant that temperature at which the viscosity of a glass is $10^{7.6}$ poises.) The color produced by NiO in a glass of the above type where $Na_2O$ and/or $Li_2O$ replaces part of the $K_2O$ tends toward amber or yellow, however, unless the total alkali metal oxide content is maintained relatively high. On the other hand, as such total alkali metal oxide content increases appreciably, the chemical stability of the glass tends to correspondingly decrease.

I have found, nevertheless, that $Na_2O$ and/or $Li_2O$ can be satisfactorily included as essential ingredients in the present reduced, neutral-colored glasses provided that the $Na_2O$ does not exceed 17%, the $Li_2O$ does not exceed 4%, the total $Na_2O$ and $Li_2O$ is not over 17%, and the total alkali metal oxide content does not exceed 25%, and preferably 20%. When the glass contains $Na_2O$ and/or $Li_2O$, the $K_2O$ content can be as low as 8% provided that the total alkali metal oxide content is at least 14%.

The following glass compositions calculated from their respective batches to the oxide basis in parts by weight are illustrative of my invention. (The amounts of the coloring oxide, NiO, being less than 0.50, are expressed to two significant places; but such practice is without significance in expressing the major constituents. Since the compositions total approximately, if not exactly, 100 the amounts given for the various constituents thereof can for practical purposes be called percent by weight.)

|  | 1 | 2 | 3 | 4 | 5 | 6 | 7 | 8 |
|---|---|---|---|---|---|---|---|---|
| $SiO_2$ | 67 | 67 | 68 | 67 | 71 | 66.6 | 53 | 66.6 |
| $K_2O$ | 18.5 | 17.5 | 16.5 | 10 | 16 | 18 | 8 | 10 |
| $Na_2O$ |  | 1.5 | 2.5 | 10 |  |  | 12 | 7 |
| $Li_2O$ | 1.5 |  |  |  |  | 2 |  |  |
| ZnO |  |  |  |  |  | 6 | 23 | 15 |
| CaO |  | 6 | 2.9 |  |  |  |  |  |
| MgO |  |  | 2.1 |  |  |  |  |  |
| $Al_2O_3$ | 6 | 1 |  | 2 |  | 2 | 2 |  |
| $B_2O_3$ | 4 | 4 | 2.5 | 8 | 10 |  |  |  |
| $ZrO_2$ |  |  | 2.5 |  |  |  |  |  |
| FeO+$Fe_2O_3$ (Computed as $Fe_2O_3$) | 2 | 2 | 2 | 2 | 2 | 3.6 | 1 | 1.2 |
| $TiO_2$ | 1 | 1 | 1 | 1 | 1 | 1.5 | 1 | 0.5 |
| NiO | 0.20 | 0.20 | 0.20 | 0.20 | 0.20 | 0.33 | 0.10 | 0.10 |

To provide the desired greenish complementary color of the iron oxides, the batches for the present glasses are melted under reducing conditions, advantageously by introducing part of the iron oxide content into each batch as a ferrous compound, for example as ferrous oxalate, or alternatively by including in a batch containing $Fe_2O_3$ a small amount of starch. Since the reducing agent, for example the oxalate radical or the starch, is completely eliminated during melting of the batch, it is not included in the final compositions given above. The proportion of oxalate or starch or other reducing agent which produces the desired result will of course vary with the glass composition and/or the particular melting conditions. Less reducing agent is required for melting in a closed melting container or covered pot than for melting in an open melting container such as a tank. The exact amount of reducing agent for all conditions cannot therefore be stated, but for each condition it can readily be determined by trial. It is preferable to utilize ferrous oxalate as the reducing agent because glasses made from batches containing it fine more readily than glasses made from batches containing starch, sugar or carbon.

Due to the fact that FeO is a stronger glass-coloring oxide than $Fe_2O_3$, the ratio of the total iron oxides to NiO or the computed $Fe_2O_3/NiO$ ratio may, without change of the neutral color, vary between 5/1 and 15/1, depending upon the proportionate amount of FeO relative to that of $Fe_2O_3$ or the extent of reduction of the glass. To decrease the ratio within such limits requires an increase in the proportionate amount of FeO or a stronger reduction and to increase the ratio requires a decrease in the proportionate amount of FeO or a weaker reduction. When the proportionate amount of FeO is thus increased the $TiO_2$ content should be correspondingly increased to counteract the increasing bluish tendency due to the FeO and thus to maintain the desired greenish complement; and, when the proportionate amount of FeO is decreased, the $TiO_2$ content should be correspondingly decreased to avoid the yellowish tendency otherwise caused by $Fe_2O_3$ and $TiO_2$.

The total iron oxide content of the glass, however, should be maintained within the limits set forth above, because an excess in the total FeO and $Fe_2O_3$ causes the general color of the glass to appear too green while a deficiency causes it to appear too red. The color due to iron is not substantially changed when the glass is tempered, that is, heated nearly to its softening point and suddenly cooled uniformly through several hundred degrees C.

With an excess of $TiO_2$ the color of the glass tends too much towards amber and with a deficiency the color tends too much towards blue.

An excess of NiO causes the color of the glass to appear too purple and a deficiency of NiO causes the color to appear too green. The color due to NiO is intensified by tempering the glass; consequently, if the glass is to be tempered, the NiO content should be lowered slightly, generally on the order of about 0.02%.

It is essential that no glass-coloring oxide other than FeO, $Fe_2O_3$, $TiO_2$ and NiO be present in the glasses of this invention because the desired neutral color cannot otherwise be obtained.

The color of the present glasses is also influenced to some extent by the selection and/or combination of certain of the optional constituents. For example, the purple complement of the NiO tends to be shifted somewhat toward amber by an increasing content of BeO or MgO and, to a less extent, of CaO unless the total alkali-metal oxide content is either near the maximum or consists of $K_2O$ and is relatively high. The presence of SrO, CdO, BaO, $Al_2O_3$, or $ZrO_2$ in the glass within the above-stated limits has no substantial effect upon its color, on the other hand.

To maintain the desired properties of the present glasses, such as good meltability, adequate physical and chemical durability, and useful ophthalmic characteristics, the proportions of the remaining constituents should be kept within the above-stated ranges for the following reasons:

An excess of $SiO_2$ or of either of the optional oxides $Al_2O_3$ or $ZrO_2$, or an insufficiency of alkali metal oxide hardens the glass and makes it difficult to melt.

Devitrification results from an excess of $SiO_2$ or ZnO, or from an excess of any of the optional oxides BeO, MgO, CaO, SrO, CdO, and BaO. Moreover for the same reason, the total MgO and CaO, if both are present, should not exceed 20%.

The chemical durability of the glass is lowered objectionably by an excess of $B_2O_3$ or of any individual alkali metal oxide or by an excess of $Na_2O$ and $Li_2O$ combined or by an excess of total alkali metal oxides, or by an insufficiency of $SiO_2$. The same difficulty is encountered if the total amount of the essential glass-stabilizing oxides is more than 30% or less than 6%.

Up to 25% total of the optional oxides BeO, MgO, CaO, SrO, CdO, or BaO, or $Al_2O_3$, or $ZrO_2$ within the above-indicated proportions or of other compatible glass-forming oxides or constituents may be included in the present glasses. Because PbO in excessive amounts tends to be readily reduced to metallic lead, it should not exceed about 3%.

Glasses of the present type in which the essential glass-stabilizing oxide is either BeO, MgO, CaO, SrO, CdO, BaO, $Al_2O_3$, or $ZrO_2$ are described and claimed in my copending application, Serial No. 351,491 filed concurrently herewith; and glasses of the present type in which the essential glass-stabilizing oxide is ZnO and which possess specifically desirable ophthalmic properties are described and claimed in my copending application, Serial No. 351,493 also filed concurrently herewith.

What is claimed is:

1. A reduced substantially neutral-colored infrared-absorbing and ultraviolet-absorbing glass comprising essentially 50 to 75% $SiO_2$, 14 to 23% $K_2O$, and at least one glass-stabilizing oxide in the indicated proportion selected from the group consisting of up to 25% ZnO and up to 20% $B_2O_3$, the total oxides of such group being 6 to 30%, and containing glass-coloring components consisting of FeO and $Fe_2O_3$ totalling 0.3 to 4.5% computed as $Fe_2O_3$, 0.1 to 2% $TiO_2$, and 0.02 to 0.50% NiO, the ratio of the computed $Fe_2O_3/NiO$ being 5/1 to 15/1, the essential constituents totalling at least 75%.

2. A reduced substantially neutral-colored infrared-absorbing and ultraviolet-absorbing glass comprising essentially 50 to 75% $SiO_2$, 14 to 20% $K_2O$, and at least one glass-stabilizing oxide in the indicated proportion selected from the group consisting of up to 25% ZnO and up to 20% $B_2O_3$, the total oxides of such group being 6 to 30%, and containing glass-coloring components consisting of FeO and Fe₂O₃ totalling 0.3 to 4.5% computed as Fe₂O₃, 0.1 to 2% TiO₂, and 0.02 to 0.50% NiO, the ratio of the computed Fe₂O₃/NiO being 5/1 to 15/1, the essential constituents totalling at least 75%.

3. A glass as claimed in claim 2 in which the selected glass-stabilizing oxide is ZnO.

4. A glass as claimed in claim 2 in which the selected glass-stabilizing oxide is B₂O₃.

5. A reduced substantially neutral-colored infrared-absorbing and ultraviolet-absorbing glass comprising essentially 50 to 75% SiO₂, 14 to 20% K₂O, and at least one glass-stabilizing oxide selected from the group consisting of up to 25% ZnO and up to 20% B₂O₃, the total oxides of such group being 6 to 30%, and containing glass-coloring components consisting of FeO and Fe₂O₃ totalling 0.3 to 4.5% computed as Fe₂O₃, 0.1 to 2% TiO₂ and 0.02 to 0.50% NiO, the ratio of the computed Fe₂O₃/NiO being 5/1 to 15/1, the essential constituents totalling at least 75%, and at least one auxiliary glass-stabilizing oxide selected from the group consisting of up to 12% BeO, up to 15% MgO, up to 20% CaO, up to 25% SrO, up to 25% CdO, up to 25% BaO, up to 15% Al₂O₃, and up to 10% ZrO₂, the total MgO and CaO not exceeding 20%, the total of such auxiliary oxides not exceeding 25%.

6. A glass as claimed in claim 5 in which the selected auxiliary glass-stabilizing oxide is Al₂O₃.

7. A glass as claimed in claim 5, in which the selected glass-stabilizing oxide is B₂O₃ and the selected auxiliary glass-stabilizing oxide is Al₂O₃.

8. A reduced substantially neutral-colored infrared-absorbing and ultraviolet-absorbing glass comprising essentially 50 to 75% SiO₂, 8 to 23% K₂O, at least one alkali metal oxide in the indicated proportion selected from the group consisting of up to 17% Na₂O and up to 4% Li₂O, the total percentage of Na₂O and Li₂O being not over 17%, the total alkali metal oxides being 14 to 25%, and at least one glass-stabilizing oxide in the indicated proportion selected from the group consisting of up to 25% ZnO and up to 20% B₂O₃, the total oxides of such group being 6 to 30%, and containing glass-coloring components consisting of FeO and Fe₂O₃ totalling 0.3 to 4.5% computed as Fe₂O₃, 0.1 to 2% TiO₂, and 0.02 to 0.50% NiO, the ratio of the computed Fe₂O₃/NiO being 5/1 to 15/1, the essential constituents totalling at least 75%.

9. A reduced substantially neutral-colored infrared-absorbing and ultraviolet-absorbing glass comprising essentially 50 to 75% SiO₂, 8 to 20% K₂O, at least one alkali metal oxide in the indicated proportion selected from the group consisting of up to 17% Na₂O and up to 4% Li₂O, the total percentage of Na₂O and Li₂O being not over 17%, the total alkali metal oxides being 14 to 20%, at least one glass-stabilizing oxide in the indicated proportion selected from the group consisting of up to 25% ZnO and up to 20% B₂O₃, the total oxides of such group being 6 to 30%, and containing glass-coloring components consisting of FeO and Fe₂O₃ totalling 0.3 to 4.5% computed as Fe₂O₃, 0.1 to 2% TiO₂ and 0.02 to 0.50% NiO, the ratio of the computed Fe₂O₃/NiO being 5/1 to 15/1, the essential constituents totalling at least 75%.

10. A glass as claimed is claim 9 in which the selected glass-stabilizing oxide is ZnO.

11. A glass as claimed in claim 9 in which the selected glass-stabilizing oxide is B₂O₃.

12. A reduced substantially neutral-colored infrared-absorbing and ultraviolet-absorbing glass comprising essentially 50 to 75% SiO₂, 8 to 20% K₂O, at least one alkali metal oxide in the indicated proportion selected from the group consisting of up to 17% Na₂O and up to 4% Li₂O, the total percentage of Na₂O and Li₂O being not over 17%, the total alkali metal oxides being 14 to 20%, and at least one glass-stabilizing oxide selected from the group consisting of up to 25% ZnO and up to 20% B₂O₃, the total oxides of such group being 6 to 30%, and containing glass-coloring components consisting of FeO and Fe₂O₃ totalling 0.3 to 4.5% computed as Fe₂O₃, 0.1 to 2% TiO₂ and 0.02 to 0.50% NiO, the ratio of the computed Fe₂O₃/NiO being 5/1 to 15/1, the essential constituents totalling at least 75%, and at least one auxiliary glass-stabilizing oxide selected from the group consisting of up to 12% BeO, up to 15% MgO, up to 20% CaO, up to 25% SrO, up to 25% CdO, up to 25% BaO, up to 15% Al₂O₃, and up to 10% ZrO₂, the total MgO and CaO not exceeding 20%, the total of such auxiliary oxides not exceeding 25%.

13. A glass as claimed in claim 12 in which the selected auxiliary glass-stabilizing oxide is Al₂O₃.

14. A glass as claimed in claim 12 in which the selected glass-stabilizing oxide is B₂O₃ and the selected auxiliary glass-stabilizing oxide is Al₂O₃.

No references cited